(12) United States Patent
Hoffmann et al.

(10) Patent No.: US 7,815,166 B2
(45) Date of Patent: Oct. 19, 2010

(54) ELECTRODYNAMIC DRIVE FOR A DISPENSING VALVE

(75) Inventors: Karsten Hoffmann, Kasseedorf/Griebel (DE); Ralf Lorenzen, Lübeck (DE)

(73) Assignee: Dräger Medical AG & Co. KG, Lübeck (DE)

( * ) Notice: Subject to any disclaimer, the term of this patent is extended or adjusted under 35 U.S.C. 154(b) by 432 days.

(21) Appl. No.: 12/026,005

(22) Filed: Feb. 5, 2008

(65) Prior Publication Data

US 2008/0245367 A1 Oct. 9, 2008

(30) Foreign Application Priority Data

Apr. 7, 2007 (DE) .................. 10 2007 016 725

(51) Int. Cl.
*F16K 31/02* (2006.01)
(52) U.S. Cl. ................ 251/129.04; 251/65; 324/207.13
(58) Field of Classification Search ............ 251/129.04, 251/129.01, 65; 324/207.13, 207.15, 207.11, 324/207.22

See application file for complete search history.

(56) References Cited

U.S. PATENT DOCUMENTS

| 5,127,400 A | | 7/1992 | DeVries et al. |
| 5,199,641 A | * | 4/1993 | Hohm et al. ............ 251/129.18 |
| 5,544,856 A | * | 8/1996 | King et al. ............. 251/129.18 |
| 6,003,481 A | * | 12/1999 | Pischinger et al. ....... 251/129.1 |
| 6,199,587 B1 | * | 3/2001 | Shlomi et al. .................. 251/65 |
| 6,321,700 B1 | * | 11/2001 | Hein et al. ............... 123/90.11 |
| 6,469,500 B1 | * | 10/2002 | Schmitz et al. ......... 324/207.16 |
| 6,916,005 B2 | * | 7/2005 | Seo et al. ............... 251/129.15 |
| 7,030,519 B2 | | 4/2006 | Slettenmark |
| 2006/0208842 A1 | * | 9/2006 | Maerky et al. .............. 335/302 |

* cited by examiner

*Primary Examiner*—John Bastianelli
(74) *Attorney, Agent, or Firm*—McGlew and Tuttle, P.C.

(57) ABSTRACT

An electrodynamic drive of a compact design is provided, particularly for a respiration system dispensing valve. The electrodynamic drive has a velocity measuring system that is uncoupled from the electrodynamic drive. The velocity measuring system is provided directly above a moving coil system, wherein the velocity measuring system has a short-circuit sleeve (15) for forming a separate magnetic circuit (221).

9 Claims, 2 Drawing Sheets

ELECTRODYNAMIC DRIVE FOR A DISPENSING VALVE

CROSS REFERENCE TO RELATED APPLICATIONS

This application claims the benefit of priority under 35 U.S.C. §119 of German Patent Application 10 2007 016 725.5 filed Apr. 7, 2007, the entire contents of which are incorporated herein by reference.

FIELD OF THE INVENTION

The present invention relates to an electronic drive of a dispensing valve.

BACKGROUND OF THE INVENTION

Electrodynamic drives are used in respiration technology to actuate valves. The valves may be gas dispensing valves, which make the breathing gas flow available, or valves within a respiration system for controlling phases of inspiration and expiration. Electrodynamic drives are part of a position control circuit, with which a certain opening stroke of the valve must be set in the shortest time possible. A velocity-proportional damping is needed for this, which is sent in the inverted form to the position control circuit.

Electrodynamic drive systems are known, in which a velocity-measuring coil is wound coaxially over the drive coil. This system has the advantage of being of a very compact design, because no additional space is needed for installation. The space requirement for the additional winding is negligible. The drawback of this solution is the electrical coupling between the drive coil and the measuring coil. A change in current in the drive coil induces a voltage in the velocity-measuring coil according to the transformer principle, i.e., not only is a velocity-proportional voltage generated, which is needed for the damping, but a change in the driving current is reproduced as well. This effect cannot be eliminated by a compensation by calculation, because this would have to take place very rapidly, in the range of about 200 Msec., and, moreover, great specimen dispersions are to be taken into account as well. The compensation could therefore take place, for reasons of stability, to a very low percentage only. The consequence of this is a damping set at a relatively low value. Damping set too high causes the system to be damped too greatly initially in case of dynamic changes and an acceleration to be too slow in case of a change in the command variable.

If, by contrast, there is a pneumatic disturbance variable in the frequency range of 50 Hz to 500 Hz, especially the higher interfering frequencies cannot be damped sufficiently strongly, because the phase shift between the real velocity and the apparent velocity generated by the transformatory coupling may be 180°. If an intensified negative feedback were offered to this apparent velocity, a positive feedback would be obtained instead of damping, and this positive feedback may generate a markedly perceptible continuous oscillation.

An electrodynamic drive in which the velocity-measuring coil is arranged coaxially over the driving direction appears, for example, from U.S. Pat. No. 7,030,519 (incorporated herein by reference).

Another system, which represents the state of the art, is a drive with a flanged velocity-measuring system. The drawbacks of the electrical coupling can be extensively avoided with this design, but this advantage is obtained at the expense of the drawback of a markedly greater space requirement, which greatly limits the possibility of installation under crowded conditions, as they frequently occur in modern, compact devices. In addition, external velocity-measuring systems are associated with the design problem of coupling with the driving coil. If a minimum clearance is left between the velocity measurement and the moving mass of the drive system, a two-mass oscillator is obtained, which may generate parasitic oscillations due to the phase shift in case of a strong negative feedback of the velocity signal.

An electrodynamic drive with flanged velocity measuring system is known from U.S. Pat. No. 5,127,400 (incorporated herein by reference).

SUMMARY OF THE INVENTION

The basic object of the present invention is to provide an electrodynamic drive of a compact design, in which the velocity measuring system is extensively uncoupled from the drive.

According to the invention, an electrodynamic drive is provided for a dispensing valve. The electrodynamic drive comprises a pot-shaped housing and a stationarily arranged first magnetic field source in the pot-shaped housing. An annular gap is provided between the first magnetic field source and the housing. A moving coil is connected to a push rod. The moving coil is arranged axially displaceably in the annular gap and cooperates with the first magnetic field source to form a first magnetic circuit. A short-circuit sleeve is provided at an end of the housing. The short-circuit sleeve faces away from the moving coil. A measuring coil is disposed within the short-circuit sleeve. A second magnetic field source is connected to the push rod in an area of the measuring coil. The second magnetic field source cooperates with the measuring coil to form a second magnetic circuit formed via the short-circuit sleeve.

A bushing consisting of a non-magnetic material may be provided. The bushing may extend from the magnetic field source to the short-circuit sleeve, wherein the push rod is mounted in the bushing.

The short-circuit sleeve may be accommodated in a recess of the pot-shaped housing. The short-circuit sleeve may have a slotted design for suppressing eddy currents.

The advantage of the present invention is essentially that a velocity measuring system is arranged directly above a moving coil array, and a separate magnetic circuit is formed for the velocity measuring system by means of a short-circuit sleeve, which is part of the velocity measuring system, the magnetic circuit being independent from the magnetic circuit of the drive system. An especially compact design can thus be obtained, because the velocity measuring system can be arranged directly at the drive system. The drive system comprises a moving coil, which is arranged in the annular gap of a magnetic field source and is guided axially by a push rod. Depending on the actuation of the moving coil, the push rod assumes a corresponding relative position in relation to the housing of the electrodynamic drive.

The bushing assumes the task of receiving both bearings of the drive and, in order not to affect the magnetic circuits, must consist of a nonmagnetic material, and it must be non-conductive, preferably consisting of a plastic, in order not to permit eddy currents.

A further uncoupling of the magnetic circuits is achieved by the short-circuit sleeve of the velocity measuring system being accommodated in a recess of the pot-shaped housing. As a result, the pot-shaped housing, which accommodates the drive system, acts at the same time as a shield for the velocity measuring system. It is especially advantageous in this connection to design the short-circuit sleeve as a slotted sleeve in order to prevent eddy currents from forming.

An exemplary embodiment of the present invention is shown in the figure and will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
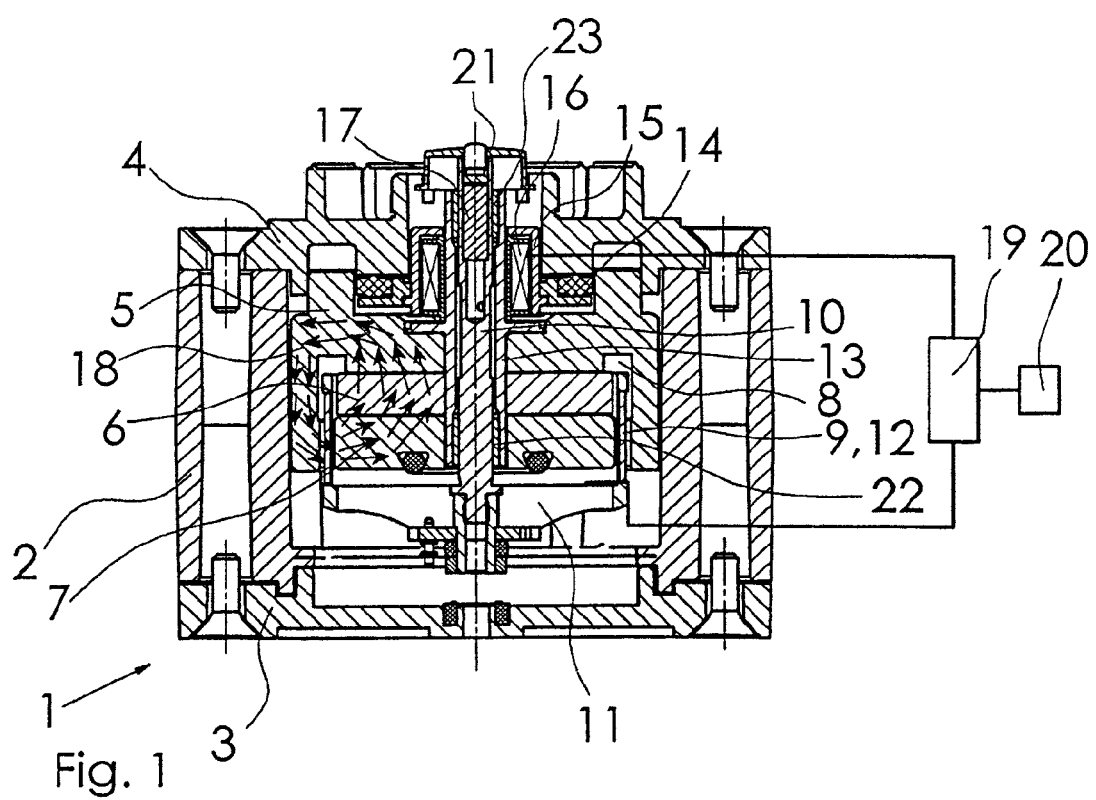
FIG. 1 is a longitudinal sectional view of an electrodynamic drive according to the invention.

Referring to the drawings in particular, FIG. 1 shows the longitudinal section of an electrodynamic drive 1. A pot-shaped housing 5, which is open towards the bottom plate 3, with a magnet 6 located on the inside and with a pole plate 7, is arranged in a cylindrical housing 2, which is closed with a bottom plate 3 and a cover plate 4. An axially displaceable moving coil 9 is located in an annular gap 8 between the inner wall of the housing 5 and the magnet 6 and the pole plate 7. The moving coil 9 comprises a coil carrier 11 attached to a tappet 10 with a drive winding 12, the drive winding 12 being located within the annular gap 8 in a first magnetic circuit 18. The tappet 10 is mounted in a plastic bushing 13 arranged centrally in the housing 5 with two bearings 22, 23 pressed in. A short-circuit sleeve 15 with a measuring coil 16 is located in a recess 14 on the top side of the housing 5. In the area of the measuring coil 16, the tappet 10 is provided with a permanent magnet 17, which moves up and down during the motion of the moving coil 9 and induces a voltage in the measuring coil 16. This voltage is sent to a control and regulating unit 19, which supplies the actuating voltage for the drive winding 12 corresponding to a preset set point 20. The tappet 10 is connected in the upper end to a valve disk 21 of a dispensing valve, not shown more specifically, the preset set points 20 relating to certain flow cross sections of the dispensing valve.

The control and regulating unit 19 contains a position control circuit, with which a certain relative position of the valve disk 21 in relation to a valve crater (valve seat) of the dispensing valve, not shown more specifically, is set. Depending on the position of the valve disk 21 in relation to the valve crater, a corresponding gas volume per unit of time can be set with the dispensing valve or a certain pressure can be maintained.

Figure 2:
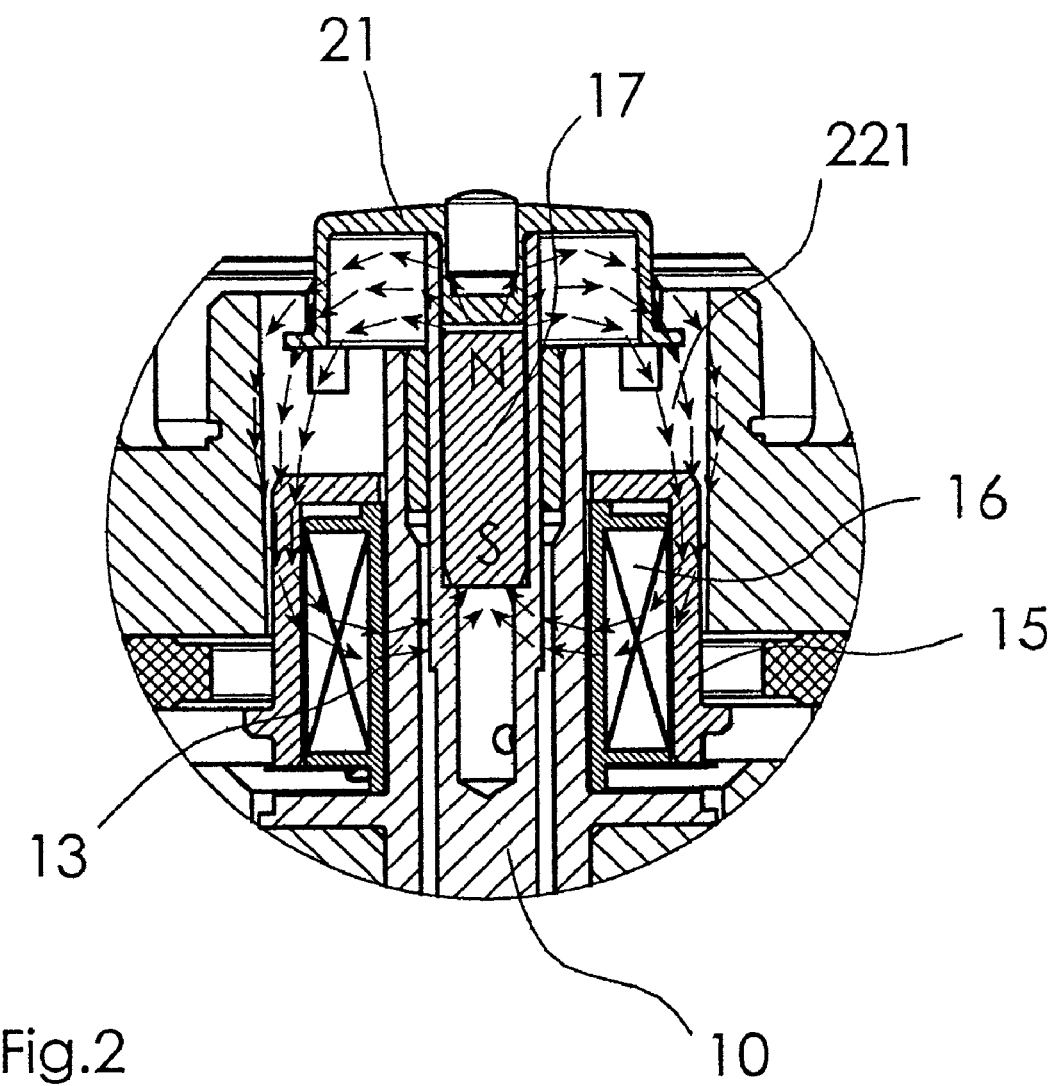
FIG. 2 is a detail view in the area of the velocity measuring system of the electrodynamic drive of FIG. 1.

FIG. 2 illustrates an enlarged view of the area around the short-circuit sleeve 15. The short-circuit sleeve 15 is needed to control a second magnetic circuit 221. Since the second magnetic circuit 221 is limited to the area of the permanent magnet 17 and the short-circuit sleeve 15 and the measuring coil 16, there is no overlap with the first magnetic circuit 18, because this extends within the pot-shaped housing 5 in the area of the annular gap 8. The short-circuit sleeve 15 has a slotted design in order to prevent the effects of eddy currents on the measuring coil 16.

While a specific embodiment of the invention has been shown and described in detail to illustrate the application of the principles of the invention, it will be understood that the invention may be embodied otherwise without departing from such principles.

What is claimed is:

1. An electrodynamic drive for a dispensing valve, the electrodynamic drive comprising:
   a pot-shaped housing;
   a stationarily arranged first magnetic field source in said pot-shaped housing, an annular gap being provided between said first magnetic field source and said housing;
   a moving coil connected to a push rod, said moving coil being arranged axially displaceably in said annular gap and cooperating with said first magnetic field source to form a first magnetic circuit;
   a short-circuit sleeve at an end of said housing, said short-circuit sleeve facing away from said moving coil;
   a measuring coil disposed within said short-circuit sleeve; and
   a second magnetic field source connected to said push rod in an area of said measuring coil, said second magnetic field source cooperating with said measuring coil to form a second magnetic circuit formed via said short-circuit sleeve.

2. An electrodynamic drive in accordance with claim 1, further comprising a bushing consisting of a non-magnetic material, said bushing extending from said magnetic field source to said short-circuit sleeve, wherein said push rod is mounted in said bushing.

3. An electrodynamic drive in accordance with claim 1, wherein said short-circuit sleeve is accommodated in a recess of said pot-shaped housing.

4. An electrodynamic drive in accordance with claim 1, wherein said short-circuit sleeve has a slotted design for suppressing eddy currents.

5. A dispensing valve electrodynamic drive comprising:
   a housing;
   a drive magnetic field source arranged stationarily in said housing, said housing and said drive magnetic field source cooperating to define an annular gap between said drive magnetic field source and said housing;
   a push rod;
   an annular moving coil connected to said push rod for movement therewith, said moving coil being arranged axially displaceably in said annular gap and cooperating with said drive magnetic field source to form a drive magnetic circuit;
   a magnetic circuit liming sleeve connected to said housing;
   a measuring coil disposed within a region of said liming sleeve; and
   a measuring magnetic field source connected to said push rod in an area of said measuring coil, said measuring magnetic field source cooperating with said measuring coil and said liming sleeve to form a measuring magnetic circuit independent from said drive magnetic circuit.

6. A dispensing valve electrodynamic drive in accordance with claim 5, further comprising a bushing consisting of a non-magnetic material, said bushing extending from said magnetic field source to said limiting sleeve, wherein said push rod is mounted in said bushing.

7. A dispensing valve electrodynamic drive in accordance with claim 6, wherein said limiting sleeve is accommodated in a recess of said housing.

8. A dispensing valve electrodynamic drive in accordance with claim 7, wherein said limiting sleeve has a slotted design for suppressing eddy currents.

9. A dispensing valve electrodynamic drive in accordance with claim 5, further comprising: a valve disk connected to said push rod, said push rod moving said valve disk for valve actuation.

* * * * *